United States Patent [19]
Classen

[11] Patent Number: 5,673,756
[45] Date of Patent: Oct. 7, 1997

[54] TURF AERATOR DRIVE ASSEMBLY

[75] Inventor: Larry E. Classen, Norfolk, Nebr.

[73] Assignee: Classen Enterprises, Inc., Norfolk, Nebr.

[21] Appl. No.: 558,261

[22] Filed: Nov. 13, 1995

[51] Int. Cl.⁶ .......................... F16D 41/12; A01B 45/02
[52] U.S. Cl. .................. 172/22; 172/42; 172/122; 172/125; 192/48.92; 192/50
[58] Field of Search ................... 192/48.92, 49, 192/50; 180/76; 172/22, 21, 42, 103, 104, 118, 122, 125

[56]  References Cited

U.S. PATENT DOCUMENTS

| | | | |
|---|---|---|---|
| 901,826 | 10/1908 | Pittman. | |
| 2,510,434 | 6/1950 | Toohey | 192/50 X |
| 2,778,467 | 1/1957 | Lewis | 192/50 |
| 3,313,049 | 4/1967 | Blozis | 172/103 X |
| 3,463,279 | 8/1969 | Breisch et al. | 192/50 X |
| 3,463,280 | 8/1969 | Hoffman et al. | 192/50 X |
| 3,589,319 | 6/1971 | Peters | 172/22 X |
| 3,720,294 | 3/1973 | Plamper | 192/50 X |
| 3,889,761 | 6/1975 | Rogers | 172/22 X |
| 4,089,387 | 5/1978 | Cook | 192/50 X |
| 4,227,706 | 10/1980 | Morris | 192/50 X |
| 4,289,224 | 9/1981 | Dobberpuhl | 192/50 |
| 4,773,486 | 9/1988 | Huber et al. | 172/22 |
| 4,799,697 | 1/1989 | Williamson et al. | 192/50 X |
| 4,909,365 | 3/1990 | Tillotson et al. | 192/50 X |
| 5,398,768 | 3/1995 | Staples | 172/43 X |
| 5,469,922 | 11/1995 | Bjorge | 172/22 |

*Primary Examiner*—Terry Lee Melius
*Assistant Examiner*—Christopher J. Novosad
*Attorney, Agent, or Firm*—Sughrue, Mion, Zinn, Macpeak & Seas

[57] ABSTRACT

A turf aerator is provided with a pair of drive wheels rotatably mounted on a drive shaft supported in a main frame of the aerator. Each drive wheel is provided with a radially extending flange and a pawl is pivotally mounted on each flange. A pair of sprockets are secured to the shaft for rotation therewith and disposed in engagement with a respective pawl. A drive sprocket is mounted for rotation with the shaft and is operatively connected to the shaft of an aerator assembly and a motor driven shaft by means of a chain interconnecting sprockets on each shaft. The pawls are arranged relative to the sprockets to positively drive the drive wheels in a forward direction while permitting one pawl to ratchet relative to the sprocket in engagement therewith and permitting rotation of the drive shaft in an opposite direction without imparting a drive to said wheels.

5 Claims, 4 Drawing Sheets

TURF AERATOR DRIVE ASSEMBLY

BACKGROUND OF THE INVENTION

The present invention is directed to a turf aerator drive assembly and more specifically to a pawl and ratchet arrangement associated with each drive wheel which provides a positive drive for each wheel in the forward direction while allowing the free rotation of one wheel during a turning operation and which permits reverse rotation of a tine disk assembly for cleaning out and replacing tines without moving the entire turf aerator rearwardly.

Conventional turf aerating machines provide a direct drive by means of a chain and sprocket assembly for simultaneously rotating the traction means as well as the turf aerating tine assembly. When it is desired to clean out the tines or replace one or more broken tines, it is necessary to roll the machine forward and backward to sequentially bring the tines into a position for servicing. Such an arrangement is disclosed in U.S. Pat. No. 4,773,486. Such a turf aerator assembly does not provide for proper turning of the aerator machine 180°. Since a drum is provided for the drive, the aerator machine will essentially turn in place so as to locate the machine in alignment with the path previously aerated instead of a desired adjacent path.

The U.S. patent to Dobberpuhl (U.S. Pat. No. 4,289,224) is directed to an independent wheel drive for a snow blower which includes a main sprocket rotatably carrying first and second pawls. Each pawl drivingly engages a respective sprocket with the first sprocket being fixed to a first axle such that the rotation of the main sprocket causes the first pawl to drivably engage the first sprocket to rotate the first axle means. A second sprocket is fixedly engaged to a second axle means such that rotation of the main sprocket causes a second pawl to drivably engage the second sprocket to cause rotation of the second axle means. Friction means supplies sufficient drag to the pawl such that rotation of the main sprocket causes each of the pawls to assume an engaging orientation with their respective sprockets. Each of the pawls can be selectively disengaged from a drive orientation by manually advancing the respective axle means, that is, when an operator maneuvers the vehicle for turning.

The U.S. patent to Cook (U.S. Pat. No. 4,089,387) discloses an adjustable ratcheting wheel hub wherein the wheels are secured to an axle by ratcheting wheel hubs. Rotation is imparted to the axle through a reversible drive chain. The drive arrangement is associated with a garden tractor and no specific implements are disclosed for use with the garden tractor or their association with the driving arrangement for the wheels.

The U.S. patent to Pittman (U.S. Pat. No. 901,826) discloses a differential gear for motor vehicles wherein pawl and ratchet assemblies are associated with the drive to each wheel to permit the turning of corners.

SUMMARY OF THE INVENTION

The present invention is directed to a new and improved turf aerating drive assembly which overcomes the disadvantages of the foregoing conventional turf aerating machines which enable a positive drive of the wheels and aerating assembly in the forward direction but provides for reverse rotation of the aerator assembly for servicing with the machine remaining stationary.

Additionally, the new and improved turf aerator drive assembly according to the present invention permits the turning of the machine 180° whereby the machine will automatically be aligned for movement along a path immediately adjacent a path previously aerated.

The present invention is directed to a new and improved drive assembly for a turf aerator comprising a main frame, a drive shaft rotatably mounted on said main frame, a pair of drive wheels rotatably mounted on said drive shaft in axially spaced apart relation, each drive wheel having a disk mounted thereon, a pawl pivotally mounted on each disk, a pair of sprockets secured to said shaft for rotation therewith and disposed in engagement with a respective pawl, drive means for rotating said drive shaft whereby upon rotation of said drive shaft in a direction to move the aerator forwardly, the pawls will engage the sprockets to provide a positive drive for the wheels while permitting one pawl to ratchet relative to the sprocket in engagement therewith and permitting rotation of said drive shaft in an opposite direction without imparting a drive to said wheels.

The invention further comprises an aerator shaft rotatably mounted in the chassis, aerator means mounted on said shaft for rotation therewith and wherein said drive means for said drive shaft is disposed in operative engagement with said aerator shaft for rotating both shafts in the same direction so that the aerator means may be rotated in a reverse direction for servicing without moving the aerator.

The above and other objects, features and advantages of the present invention will be more apparent and more readily appreciated from the following detailed description of preferred exemplary embodiment of the present invention, taken in connection with the accompanying drawings.

DETAILED DESCRIPTION OF THE INVENTION

Figure 1:
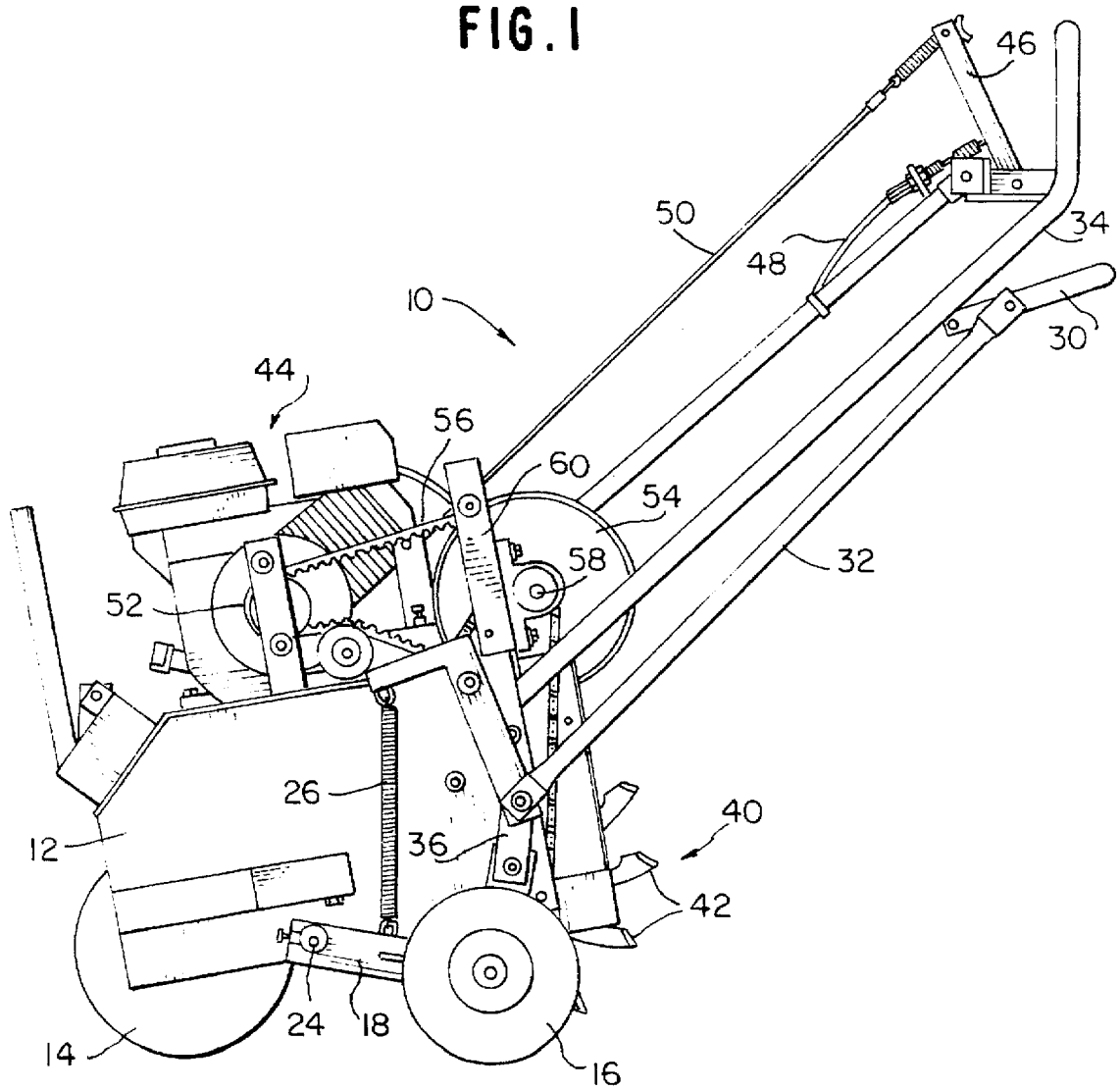
FIG. 1 is a side elevational view of an aerator according to the present invention.

The turf aerator 10 shown in FIG. 1, is fairly conventional with the exception of the drive assembly for the drive wheels and the tine assembly, the details of which will be described hereinafter.

The aerator 10 includes a main frame 12, a front wheel assembly 14 rotatably supported in said main frame and a pair of rear wheels 16, one of which is shown in FIG. 1. Each of the rear wheels 16 are mounted on the chassis 12 through a corresponding support arm 18 which is pivoted about an axis 24 which is parallel to the rotational axis of the wheels 14. The wheels 16 and the associated support arms 18 are biased upwardly relative to the chassis 12 through tension springs, one of which is illustrated at 26. The wheels 16 have operative association with a control handle 30 through control rods 32, respectively so as to enable selective raising and lowering of the wheels 16 relative to the chassis 12. In this manner, the chassis may be raised and lowered about the rotational axis of the wheels 14 relative to a turf or soil surface over which the aerator operates. The control handle 30 is pivotally mounted to a main control handle 34 having the lower end thereof secured to the main frame 12. The support wheels 16, along with their associated support arms 18 and interconnecting linkage 36 to the control rods 32 and control handle 30, define rear support means for the main frame 12 to facilitate movement of the main frame between a lowered operating position and a raised transport position in a known manner.

The aerator 10 includes aerating means in the form of a tine wheel assembly, indicated generally at 40, which is mounted on the main frame 12 for rotation about a fixed rotational axis parallel to the axis of rotation of the wheels 14. The tine wheel assembly 40 includes a plurality of selectively positioned tubular coring tines 42 is best seen in FIG. 2 and is positively interconnected to power drive means in the form of a suitable internal combustion engine 44 through clutch means (not shown) in a conventional manner so as to enable an operator to control both engine speed and driving rotation of the tine wheel assembly 40 through a throttle-clutch control handle 46 having interconnection to the engine and clutch through a throttle control cable 48 and a clutch control cable 50 in a known manner.

An output pulley 52, connected to the drive shaft of the motor 44, is connected to a larger pulley 54 by means of a cogged belt 56. The pulley 54 is rotatably mounted on a shaft 58 which is rotatably supported on the main frame 12 by means of a support frame 60.

Figure 2:
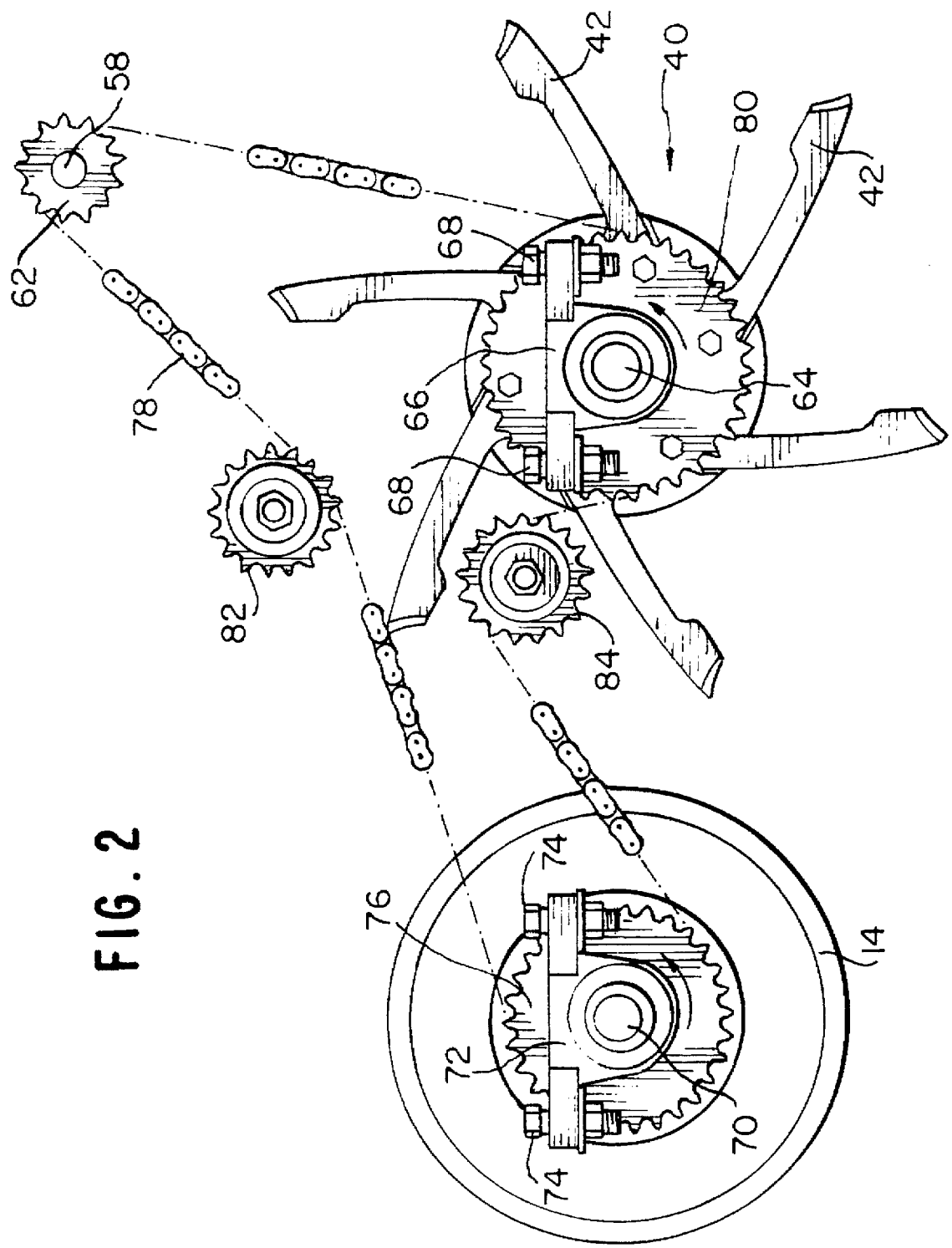
FIG. 2 is a side elevational view of the drive arrangement per se for rotating the wheels and the aerator assembly.

A toothed wheel 62 is also secured to the shaft 58 as shown in FIG. 2. The tine assembly 40 is connected to a shaft 64 for rotation about an axis parallel to the axis of the wheels 14. The shaft 64 is mounted in a pillow block 66 which is adapted to be mounted on the main frame 12 by means of the bolts 68.

Figure 4:
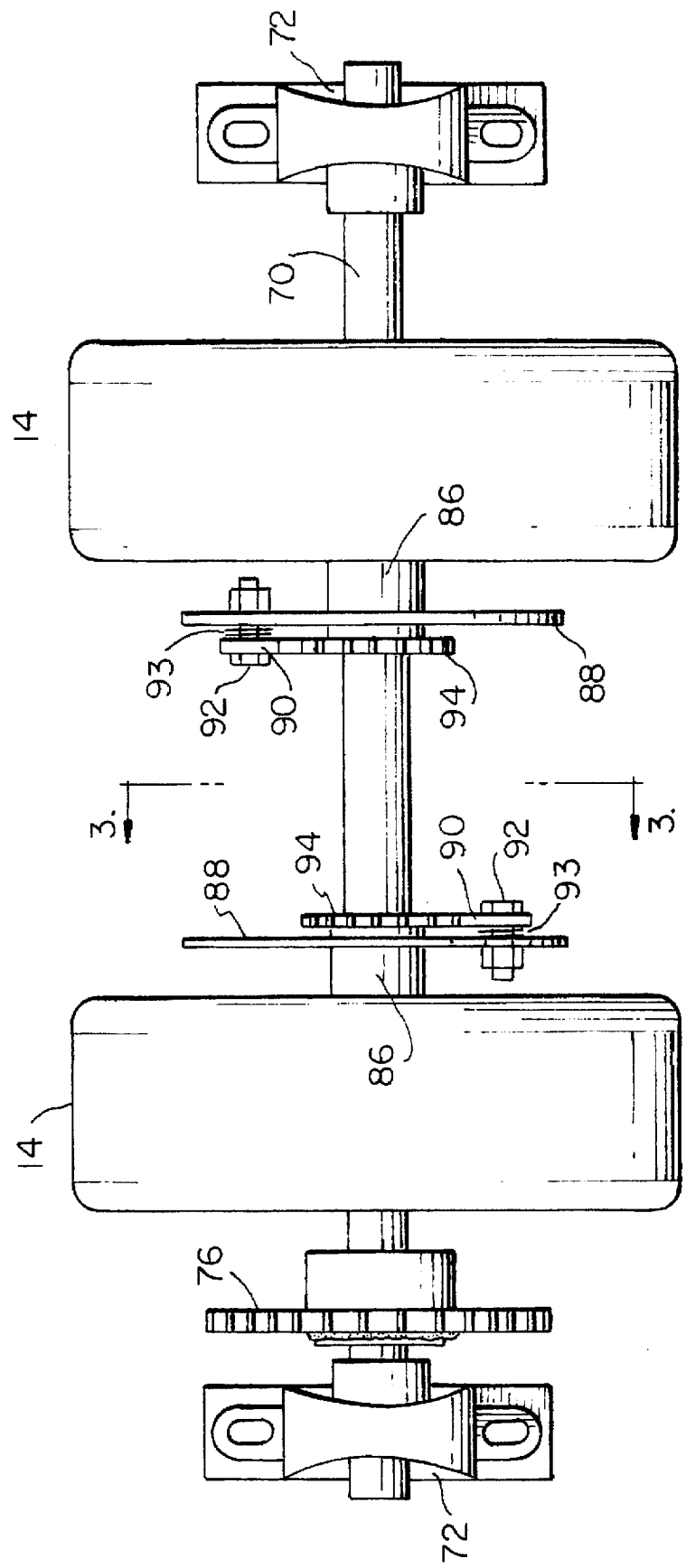
FIG. 4 is a top plan view of the drive shaft, wheels and driving arrangement therefor.

The wheels 14, as best seen in FIGS. 2 and 4, are mounted for rotation on a drive shaft 70, which is mounted for rotation in a pair of pillow blocks 72, which are adapted to be mounted to the main frame 12 by means of bolts 74. A toothed wheel 76 is secured to the shaft 70 for rotation therewith by any suitable means such as welding or the like. A chain 78 is entrained about the toothed wheel 62, the toothed wheel 76 and a toothed wheel 80, which is mounted for rotation with the shaft 64. Idler wheels 82 and 84 engage the chain 78 to provide the necessary tensioning and guiding. Therefore, upon rotation of the shaft 58, by means of the motor assembly 44, the chain will rotate the shafts 70 and 64 in the counterclockwise direction as shown by the arrows in FIG. 2.

Figure 3:
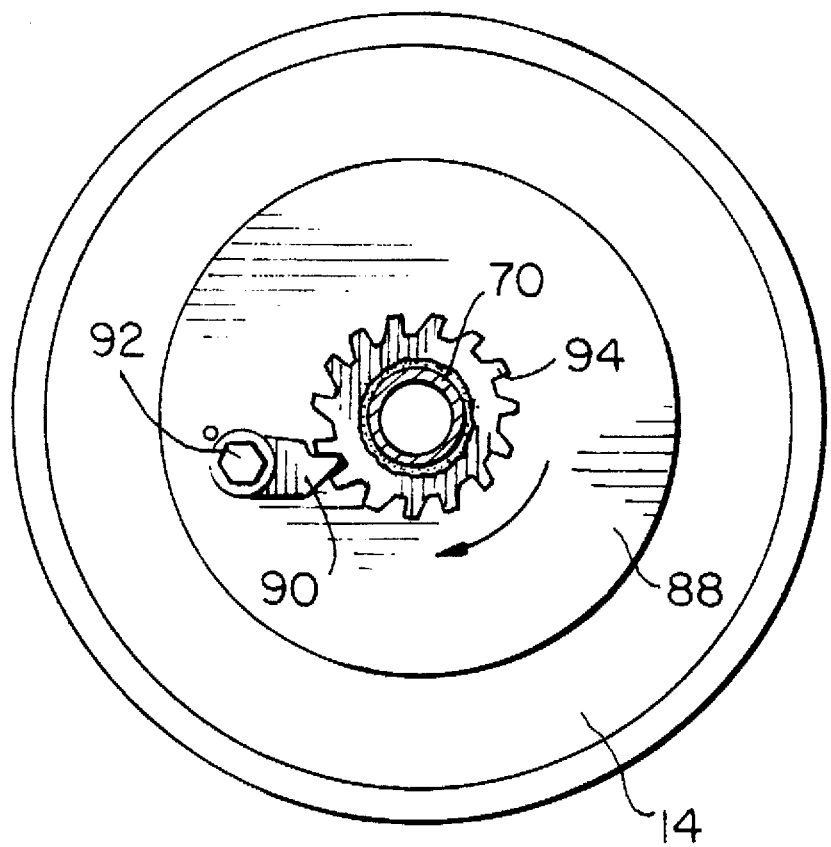
FIG. 3 is a sectional view taken along the line 3—3 of FIG. 4.

As best seen in FIG. 4, the wheels 14 are rotatably supported on the shaft 70 by means of hubs 86, each of which has a radially extending flange 88 secured thereto. A pair of pawls 90 are pivotally mounted on the flanges 88 by means of nut and bolt assemblies 92 and are biased by means of springs 93 into engagement with the pair of toothed sprocket wheels 94, which are mounted on the shaft 70 for rotation therewith. Upon rotation of the shaft 70 in the direction of the arrow as shown in FIG. 3, the pawl 90 will engage the teeth of the sprocket wheel 94, whereby the rotation of the sprocket wheel 94 will impart rotation to the flange 88, which in turn rotates the wheel 14 in the same direction. The other pawl 90 engages the teeth of the associated sprocket wheel 94 in the same manner so that upon rotation of the shaft 70 in the direction of the arrow, both pawls 90 will positively engage the teeth of the respective sprocket wheels 94 for positively rotating both wheels 14 in a direction to move the aerator forwardly. Upon movement of the aerator rearwardly by the application of manual force, the pawls 90 will simply ratchet over the teeth of the respective sprocket wheels 94.

When it is desired to turn the aerator 180° at the end of a first path, the weight of the aerator is tilted forwardly about the shaft 70 and the aerator is manually turned in the desired direction. The pawl 90 associated with the wheel 14 having the shortest turning radius will remain engaged with the teeth of the respective sprocket wheel 94 while the pawl 90 associated with the wheel 14 having the larger turning radius, will ratchet over the teeth of the associated sprocket wheel 94.

During a servicing operation with the engine turned off, it is possible to rotate the tine assembly in a direction opposite to that indicated by the arrow in FIG. 2 without having to move the aerator machine in any direction. The pawls 90 of the drive assembly will simply ratchet over the teeth of the respective sprocket wheels 94. Thus the tine assembly can be cleaned for specific times or replaced or repaired in a simple and convenience manner. According to conventional machines, it was always necessary to move the entire aerator machine rearwardly in order to properly position the tine assembly for service.

While the invention has been particularly shown and described with reference to preferred embodiments thereof, it will be understood by those in the art that the foregoing and other changes in form and details may be made therein without departing from the spirit and scope of the invention.

What is claimed is:

1. A turf aerator comprising a main frame, a driven shaft rotatably mounted on said main frame, a pair of wheels rotatably mounted on said driven shaft in axially spaced apart relation, each wheel having a radially extending flange mounted thereon, a pawl pivotally mounted on each flange, a pair of sprockets secured to said shaft for rotation therewith with each sprocket disposed in engagement with a respective pawl, drive means for rotating said driven shaft, whereby upon rotation of said driven shaft, in a direction to move the aerator forwardly, the pawls will engage the sprockets to provide a positive drive for the wheels while permitting one pawl to ratchet relative to the sprocket in engagement therewith upon turning of the aerator in either direction and permitting rotation of said driven shaft in an opposite direction without imparting a driving force to said wheels.

2. An aerator as set forth in claim 1, further comprising an aerator shaft rotatably mounted in said main frame, aerator means mounted on said aerator shaft for rotation therewith and wherein said drive means for said driven shaft is disposed in operative engagement with said aerator shaft for rotating both shafts in the same direction whereby said aerator means may be rotated in a reverse direction for servicing without moving the aerator.

3. An aerator as set forth in claim 1, further comprising spring means for normally biasing said pawls into engagement with said sprockets.

4. An aerator as set forth in claim 2, wherein said drive means include a first sprocket operatively connected to motor means on said main frame, a second sprocket mounted on said driven shaft and a third sprocket mounted on said aerator shaft, said first, second and third sprockets being mounted in a common plane and a single drive chain mounted on said sprockets for imparting drive from said motor means to said aerator means and said drive wheels.

5. A drive assembly for a turf aerator comprising a driven shaft adapted to be rotatably mounted on a frame of said aerator, a pair of wheels rotatably mounted on said driven shaft in axially spaced apart relation, each wheel having a radially extending flange mounted thereon, a pawl pivotally mounted on each flange, a pair of sprockets secured to said shaft for rotation with each sprocket disposed in engagement with a respective pawl, drive means for rotating said driven shaft whereby upon rotation of said driven shaft in a first direction, said pawls will engage said sprockets to provide a positive drive for the wheels while permitting one pawl to ratchet relative to the sprocket in engagement therewith during turning of the aerator in either direction and both pawls permitting rotation of said driven shaft in an opposite direction without imparting a drive to said wheels.

* * * * *